United States Patent
Akahane

(10) Patent No.: US 12,480,239 B2
(45) Date of Patent: Nov. 25, 2025

(54) SEWING MACHINE AND METHOD FOR CONTROLLING SEWING MACHINE

(71) Applicant: JANOME Corporation, Tokyo (JP)

(72) Inventor: Kentaro Akahane, Tokyo (JP)

(73) Assignee: JANOME CORPORATION, Tokyo (JP)

( * ) Notice: Subject to any disclaimer, the term of this patent is extended or adjusted under 35 U.S.C. 154(b) by 49 days.

(21) Appl. No.: 18/127,759

(22) Filed: Mar. 29, 2023

(65) Prior Publication Data
US 2024/0295056 A1    Sep. 5, 2024

(30) Foreign Application Priority Data
Mar. 2, 2023    (JP) .................... 2023-032217

(51) Int. Cl.
*D05B 19/12*    (2006.01)
*G05B 19/042*    (2006.01)
*G06T 7/00*    (2017.01)
*G06T 7/20*    (2017.01)

(52) U.S. Cl.
CPC .......... *D05B 19/12* (2013.01); *G05B 19/042* (2013.01); *G06T 7/0004* (2013.01); *G06T 7/20* (2013.01); *D05D 2205/04* (2013.01); *G05B 2219/2626* (2013.01); *G06T 2207/30164* (2013.01)

(58) Field of Classification Search
CPC ........ D05B 19/02; D05B 19/12; D05B 19/14; D05C 5/02
See application file for complete search history.

(56) References Cited

U.S. PATENT DOCUMENTS

| | | | | |
|---|---|---|---|---|
| 5,899,158 A | * | 5/1999 | Yoshida | D05B 19/12 112/102.5 |
| 6,883,446 B2 | * | 4/2005 | Koerner | D05B 69/28 112/272 |
| 7,325,502 B2 | | 2/2008 | König et al. | |
| 10,472,752 B2 | | 11/2019 | Imano et al. | |
| 2006/0112866 A1 | * | 6/2006 | Pfeifer | D05B 11/00 112/117 |

FOREIGN PATENT DOCUMENTS

| | | |
|---|---|---|
| JP | 2002-292175 A | 10/2002 |
| JP | 2018-110608 A | 7/2018 |

* cited by examiner

*Primary Examiner* — Nathan E Durham
(74) *Attorney, Agent, or Firm* — MATTINGLY & MALUR, PC

(57) ABSTRACT

A sewing machine includes a rotational speed determination unit configured to determine a rotational speed instruction value on the basis of information from a movement detection sensor that detects movement of a workpiece and a predetermined sewing pitch amount, an upper limit rotational speed setting unit configured to set an upper limit rotational speed value, a rotational speed control unit configured to control a rotational speed to the rotational speed instruction value and control the rotational speed to the upper limit rotational speed value when the rotational speed instruction value reaches the upper limit rotational speed value, and a sewing machine motor driven at the controlled rotational speed to operate a needle. Rotational speed control of the sewing machine motor according to a movement amount of the workpiece is executed, but the rotational speed is controlled so as not to exceed the upper limit rotational speed.

17 Claims, 7 Drawing Sheets

SEWING MACHINE AND METHOD FOR CONTROLLING SEWING MACHINE

CROSS-REFERENCE TO RELATED APPLICATION

This application claims priority to Japanese Patent Application No. 2023-032217 entitled "SEWING MACHINE AND METHOD FOR CONTROLLING SEWING MACHINE" filed on Mar. 2, 2023, the disclosure of which is hereby incorporated by reference in its entirety herein.

BACKGROUND

1. Technical Field

The present disclosure relates to a sewing machine and a method for controlling the sewing machine.

2. Related Art

For example, as disclosed in JP 2018-110608 A, there is a sewing machine configured to keep a sewing pitch constant by monitoring movement of a workpiece by a sensor, and controlling a rotational speed of a sewing machine motor that operates a needle according to the movement amount of the workpiece.

SUMMARY

The sewing machine as disclosed in JP 2018-110608 A controls the rotational speed of the sewing machine motor using only movement amount of the workpiece calculated on the basis of the detection signal from the sensor as a parameter.

However, in JP 2018-110608 A, flexible control of the sewing machine based on various input information has not been studied.

Accordingly, a mechanism for flexibly controlling a sewing machine based on various input information is provided herein.

For this object, as an example, configurations according to the claims are employed.

The disclosure herein includes a plurality of configurations and methods for achieving the object, and an example thereof relates to a sewing machine. The sewing machine includes the following components: a rotational speed determination unit configured to determine a rotational speed instruction value on the basis of information from a movement detection sensor for detecting movement of a workpiece and a predetermined sewing pitch amount; an upper limit rotational speed setting unit configured to set an upper limit rotational speed value; a rotational speed control unit configured to control a rotational speed to the rotational speed instruction value, wherein the rotational speed control unit is configured to control the rotational speed to the upper limit rotational speed value if the rotational speed instruction value reaches the upper limit rotational speed value; and a sewing machine motor that operates a needle at the controlled rotational speed.

According to the embodiment above, it is possible to provide a mechanism for flexibly controlling the sewing machine based on various input information.

Other aspects are disclosed in the following detailed description.

DETAILED DESCRIPTION

Hereinafter, some embodiments will be described by illustrating specific examples.

Figure 1:
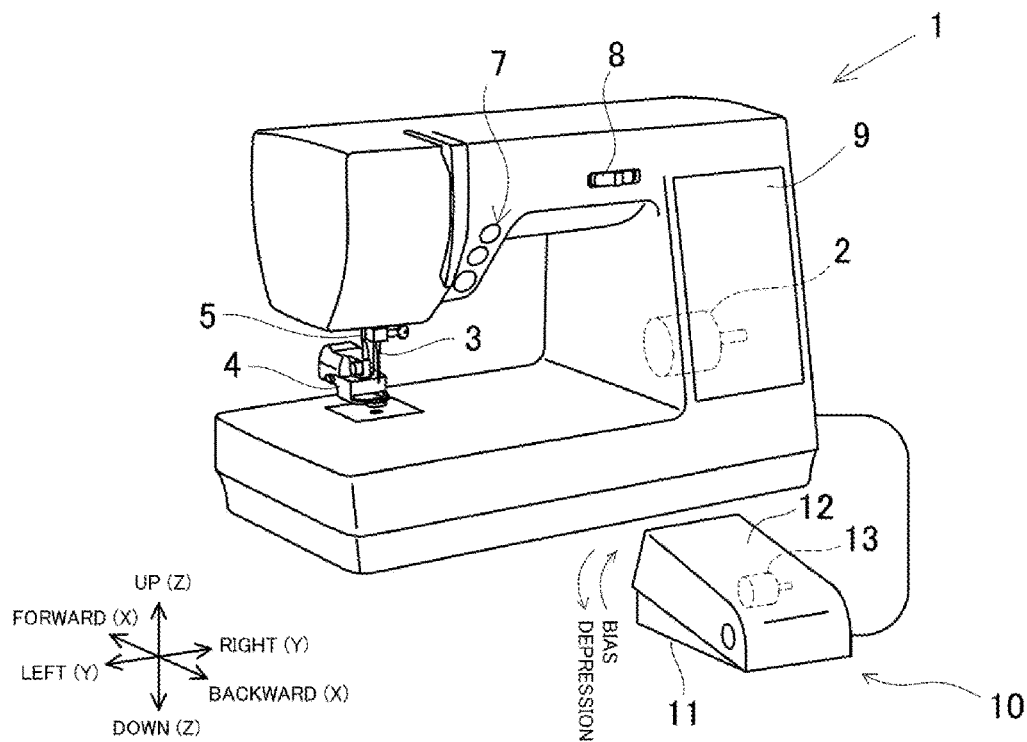
FIG. 1 is an exemplary view illustrating an example of a sewing machine.
Figure 2:
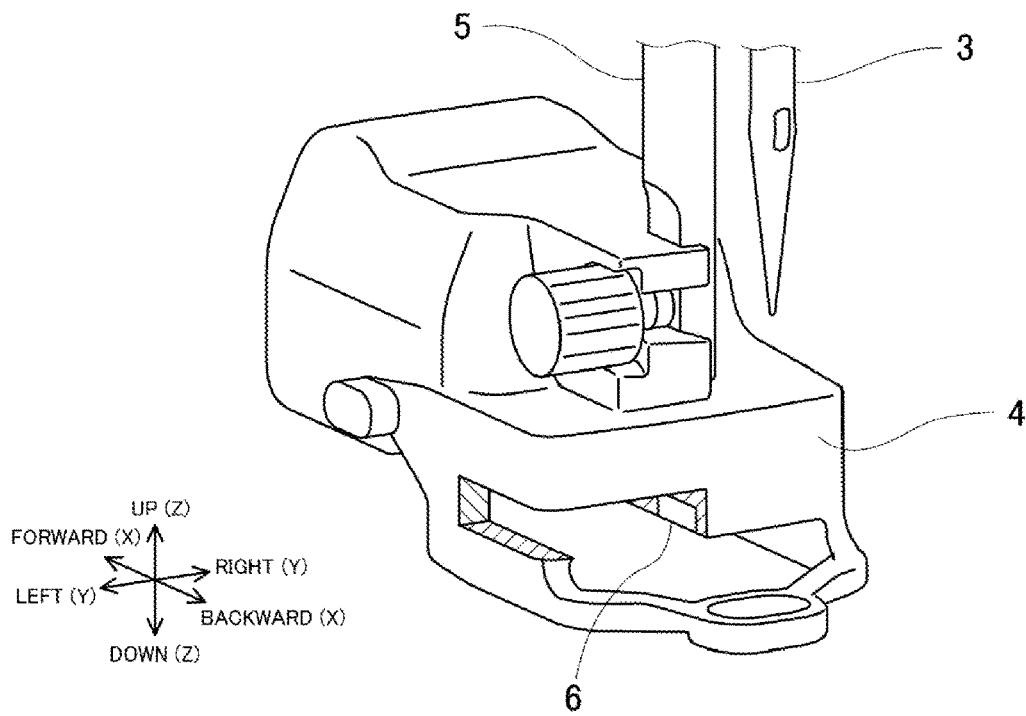
FIG. 2 is an example of an enlarged view illustrating a portion of a movement detection sensor in the sewing machine illustrated in FIG. 1, including a partial cross section.

FIG. 1 illustrates an example of a sewing machine. The sewing machine 1 operates a needle 3 by a sewing machine motor 2 via the known link mechanism, and executes a sewing operation in synchronization with the movement of a workpiece (not illustrated) pressed with a presser 4 and manipulated by a user. In the sewing operation, an upper thread and a lower thread (not illustrated) are crossed to form seams on the workpiece. A sewing pitch means an interval between the seams. The presser 4 is attached to a presser rod 5 that can move up and down in accordance with the operation of the needle 3. As illustrated in FIG. 2, a movement detection sensor 6 is incorporated in the presser 4. The movement detection sensor 6 comprises, for example, an image sensor, and performs image processing on image data obtained by imaging the surface of the workpiece by the image sensor to acquire information regarding the movement of the workpiece. Alternatively, an optical sensor can be used for the movement detection sensor 6. The optical sensor scans the surface contour of the workpiece using visible light, infrared rays, or the like to detect the movement amount of the workpiece.

In addition, the sewing machine 1 includes a start/stop key 7, a speed controller 8, and a touch panel display 9 at positions where the user can easily operate. The start/stop key 7 is used for a start/stop control of the sewing operation, and is provided as a push button in this example. In this example, the speed controller 8 is an analog device comprising a sliding knob whose output level varies according to a position where the user slides the knob left and right. Although the sliding knob is illustrated as an example, a rotary knob or other possible devices may be used. Alternatively, a digital device, which processes an input in digital form, may be used. As an example, a display 9 is provided as a liquid crystal panel. The display 9 displays a function and an operation state of the sewing machine 1, and is also used to input various parameters by touching a setting screen or the like. In particular, in this example, a user can perform setting input of the sewing pitch by touching a predetermined region of the display 9 displaying the setting screen.

In an example, a foot controller 10 can be connected to the sewing machine 1 through an input/output terminal. The foot controller 10 has a footboard 12 which is pivotally attached in a swingable manner to a base 11. The footboard 12 is biased to return when a user's foot is moved away so that an output is generated by depressing the footboard 12 against the biasing force. The foot controller 10 has an encoder 13 which is built in the base 11. An output corresponding to a depression amount of the footboard 12 is thereby obtained. The output may be an analog signal or digital information.

[Example of Processor]

Figure 3:
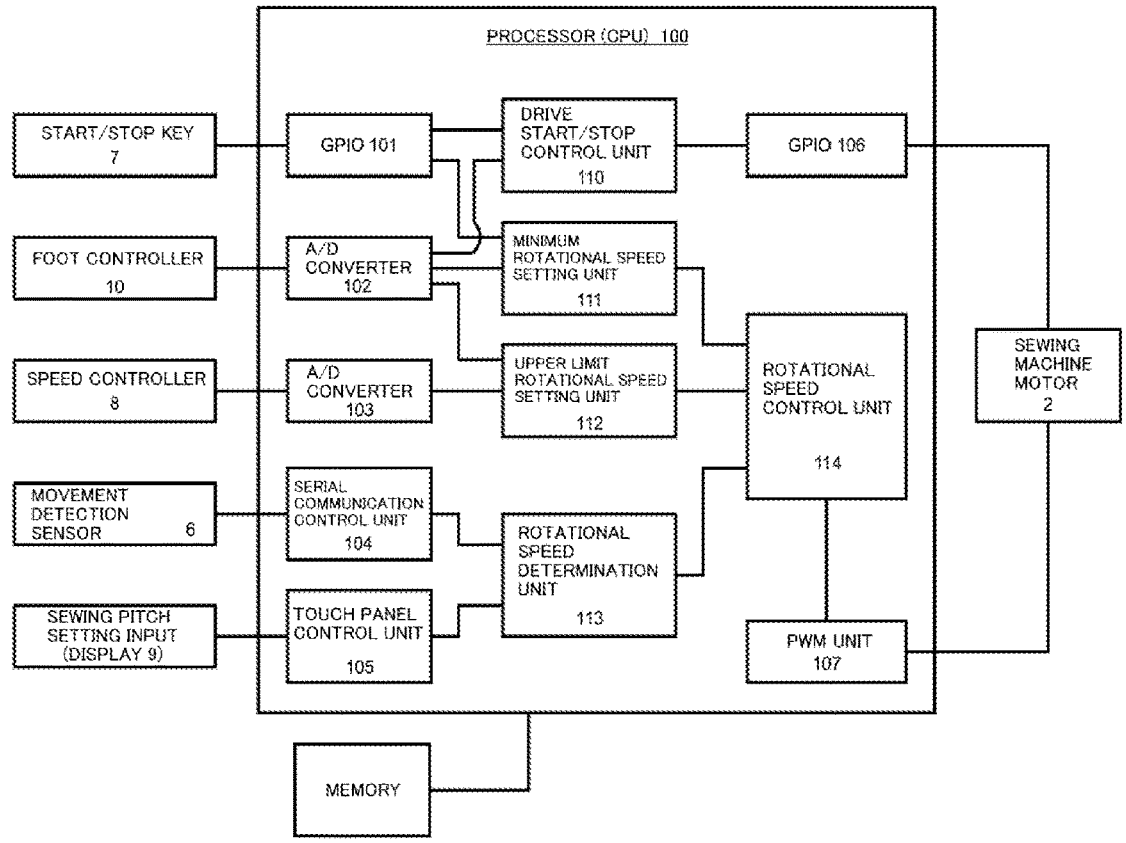
FIG. 3 is an exemplary block diagram illustrating an example of a processor that drives a sewing machine motor.

FIG. 3 is a block diagram illustrating an example of a processor 100 provided for the sewing machine 1 and configured to control the sewing operation. The processor (CPU) 100 includes, for example, an application specific integrated circuit (ASIC), a field-programmable gate array (FPGA), or a programmable logic controller (PLC), and executes a computer program stored in an external or internal memory to control the sewing operation. In the processor 100, each of units as described below can be configured as a software module or a hardware module.

The processor 100 includes a general purpose input/output (GPIO) 101, A/D converters 102 and 103, a serial communication control unit 104, and a touch panel control unit 105, as input units. The GPIO 101 is a terminal to which a signal from the start/stop key 7 is input. The A/D converter 102 converts the analog output from the foot controller 10 into a digital form. The A/D converter 103 converts the analog output from the speed controller 8 into a digital form. The serial communication control unit 104 receives information from the movement detection sensor 6. The touch panel control unit 105 totally controls the display 9, and in particular, allows a user to input the setting of a sewing pitch amount by touching the setting screen displayed on the display 9, and receives the input information.

Particularly, the start/stop key 7 generates a high level signal when pressed, and maintains a low level signal when not pressed. When a user presses the start/stop key 7 in order to start the sewing operation (in other words, at the time of stopping the sewing operation) and a high level signal is thereby provided to the GPIO 101, the processor 100, which has detected this high level signal, starts to drive the sewing machine motor 2 at the minimum rotational speed. When the user presses the start/stop key 7 during the sewing operation and a high level signal is thereby provided to the GPIO 101, the processor 100, which has detected this high level signal, stops the driving of the sewing machine motor 2.

The analog output of the foot controller 10 is at the lowest level when the foot controller 10 is released (there is no depression). When the foot controller 10 is depressed, the level of the analog output increases according to the depression amount. When a user depresses the foot controller 10 at the time of stopping the sewing operation, the level of the analog output rises from the minimum level, and the processor 100, which has detected this output rise, starts to drive the sewing machine motor 2 at the minimum rotational speed. Then, the processor 100 detects the depression amount of the foot controller 10 based on the increased analog output level and sets an upper limit rotational speed value for the sewing machine motor 2. When the user releases (takes his or her foot off) the depression of the foot controller 10 during the sewing operation, the analog output decreases to the lowest level, and the processor 100, which has detected this output decrease, may perform control to stop the driving of the sewing machine motor 2.

The speed controller 8, which is a sliding knob in this embodiment, changes the analog output level according to the position where a user slides and stops the knob. The processor 100 sets the upper limit rotational speed value for the sewing machine motor 2 according to the output level (in other words, the position of the knob) of the speed controller 8 during the sewing operation.

The movement detection sensor 6 periodically executes serial communication with the processor 100 via the serial communication control unit 104, and information regarding the movement amount of the workpiece detected by the movement detection sensor 6 is periodically received as serial data. Then, the processor 100 determines a rotational speed instruction value for the sewing machine motor 2 so that the sewing pitch becomes constant, on the basis of the sewing pitch amount set according to sewing pitch setting input by a user and the moving speed of the workpiece based on the information of the movement detection sensor 6.

The setting of the sewing pitch input by a user touching the display 9 is provided to the processor 100 through the touch panel control unit 105.

The processor 100 includes a GPIO 106 and a pulse width modulation (PWM) unit 107, as output units. The GPIO 106 provides an ON signal (High level) and an OFF signal (Low level) to the sewing machine motor 2. In accordance with this signaling, the driving power supply for the sewing machine motor 2 is turned on or off. The PWM unit 107 generates a current value corresponding to a rotational speed controlled as described later with a pulse width modulation (PWM) waveform and provides the current value to the sewing machine motor 2. The sewing machine motor 2 is operated at the controlled rotational speed to operate the needle 3.

The processor 100 includes a drive start/stop control unit 110, a minimum rotational speed setting unit 111, an upper limit rotational speed setting unit 112, a rotational speed determination unit 113, and a rotational speed control unit 114 in order to execute control of start/stop of the sewing operation (drive start/stop of the sewing machine motor 2) and control of rotational speed of the sewing machine motor 2 during the sewing operation.

The drive start/stop control unit 110 receives a signal of the start/stop key 7 from the GPIO 101, and receives an output of the foot controller 10 which has been converted into a digital form by the A/D converter 102. In response to these inputs, the drive start/stop control unit 110 provides an ON signal or an OFF signal to the sewing machine motor 2 via the GPIO 106.

The minimum rotational speed setting unit 111 receives a signal of the start/stop key 7 from the GPIO 101, and receives an output of the foot controller 10 which has been converted into a digital form by the A/D converter 102. In response to these inputs, the minimum rotational speed setting unit 111 sets a minimum rotational speed value for the rotational speed control unit 114.

The upper limit rotational speed setting unit 112 receives an output of the foot controller 10 which has been converted into a digital form by the A/D converter 102, and receives an output of the speed controller 8 which has been converted into a digital form by the A/D converter 103. According to the levels of these output, the upper limit rotational speed setting unit 112 sets an upper limit rotational speed value for the rotational speed control unit 114.

The rotational speed determination unit 113 receives information regarding movement of the workpiece from the movement detection sensor 6 via the serial communication control unit 104, and receives the sewing pitch amount set by a user via the touch panel control unit 105. Based on these pieces of information, the rotational speed determination unit 113 determines and provides a rotational speed instruction value to the rotational speed control unit 114.

The rotational speed control unit 114 controls the PWM unit 107 according to any one of the minimum rotational speed value, the upper limit rotational speed value, and the rotational speed instruction value, determined by the units described above. The rotational speed of the sewing machine motor 2 is controlled via the PWM unit 107.

Figure 4:
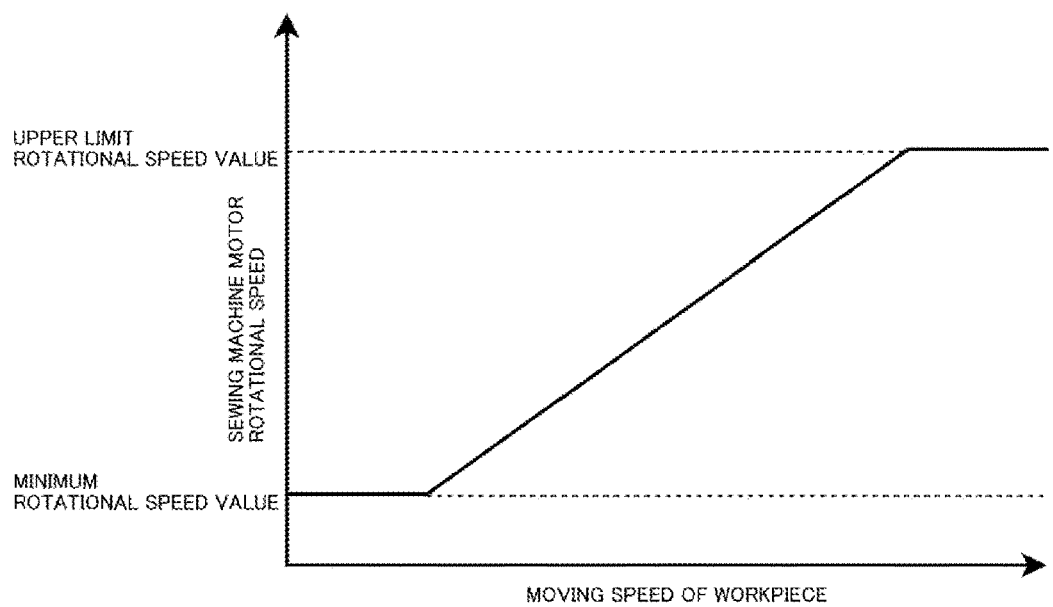
FIG. 4 is an exemplary control chart illustrating a rotational speed of the sewing machine motor with respect to a moving speed of a workpiece.

By the processor 100 controlling the rotational speed to any one of the minimum rotational speed value, the upper limit rotational speed value, and the rotational speed instruction value, the rotational speed of the sewing machine motor 2 is controlled in the sewing operation as in the control chart illustrated in FIG. 4. The chart of FIG. 4 is a graph in which the horizontal axis represents the moving speed of the workpiece and the vertical axis represents the rotational speed of the sewing machine motor 2. Before the rotational speed instruction value by the rotational speed determination unit 113 reaches the minimum rotational speed value by the minimum rotational speed setting unit 111, the rotational speed is controlled to the minimum rotational speed value. Thereafter, when the rotational speed instruction value exceeds the minimum rotational speed value, the rotational speed is controlled to the rotational speed instruction value by the rotational speed determination unit 113, thereby changing in accordance with the moving speed of the workpiece. The operation of the needle 3 is adjusted so that the set sewing pitch is achieved. Then, when the rotational speed instruction value by the rotational speed determination unit 113 reaches the upper limit rotational speed value by the upper limit rotational speed setting unit 112 as the moving speed of the workpiece is increased, the rotational speed is controlled to the upper limit rotational speed value even if the moving speed of the workpiece is further increased.

[Example of Sewing Operation Start/Stop Control]

Figure 5:
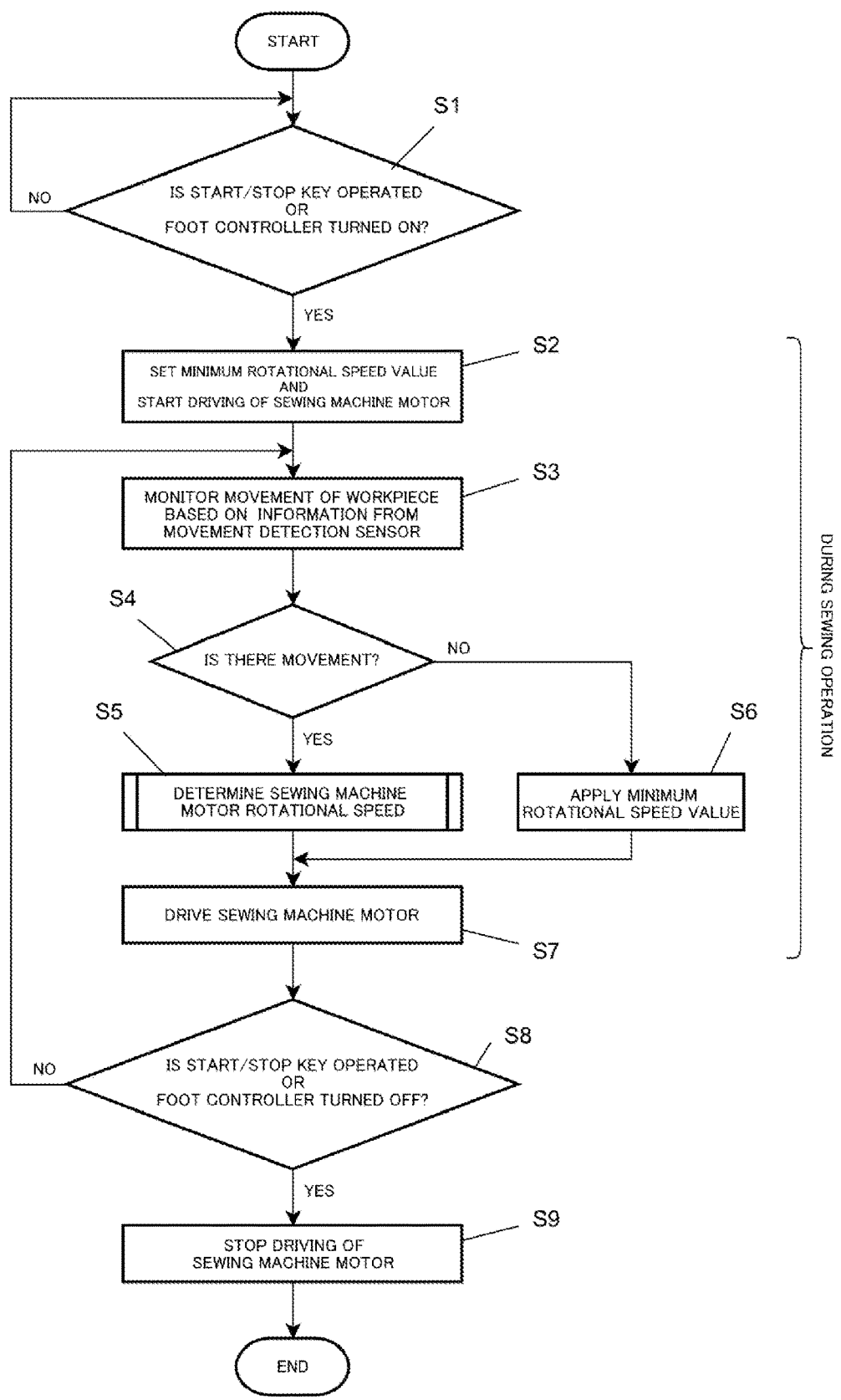
FIG. 5 is an exemplary flowchart illustrating an example of sewing operation start/stop control executed by the processor.

FIG. 5 illustrates a control flowchart from the start to the stop of the sewing operation executed by the processor 100 through the above-described units. This control is started, for example, when a user turns on the main power of the sewing machine 1 and performs touch selection of a free motion-stitch regulator (ASR) function on the display 9.

At step S1, the drive start/stop control unit 110 determines whether the start/stop key 7 of the sewing machine 1 is manipulated (pressed) or whether the foot controller 10 is turned on (depressed) if the foot controller 10 is connected. When neither the start/stop key 7 is manipulated nor the foot controller 10 is turned on (NO), step S1 is continued. When the manipulation of the start/stop key 7 or the turn-on of the foot controller 10 is identified (Yes), the process proceeds to step S2, and at step S2, the minimum rotational speed setting unit 111 sets the minimum rotational speed value. The rotational speed control unit 114 controls the rotational speed to the minimum rotational speed value, and provides the PWM waveform from the PWM unit 107 to the sewing machine motor 2 to start driving. The sewing machine motor 2 is started at the minimum rotational speed to cause the needle 3 to move up and down at the minimum speed (start of sewing operation). In another example of step S1, if the foot controller 10 is connected to the sewing machine 1, the start/stop key 7 may be disabled (in this case, only control using the foot controller 10 may be executed). Regarding the connection or non-connection of the foot controller 10, for example, when the foot controller 10 is connected to the sewing machine 1 after the operation of the sewing machine 1 is started in response to the start/stop key 7, the processor 100 can execute control to stop the operation of the sewing machine 1 in terms of safety. After this stop, the process can be re-executed from step S1.

When the minimum rotational speed value is set and the driving of the sewing machine motor 2 is started, the process proceeds to step S3, and at step S3, the rotational speed determination unit 113 that acquires the information from the movement detection sensor 6 via the serial communication control unit 104 monitors the movement of the workpiece. At step S4, the rotational speed determination unit 113 determines the movement amount of the workpiece based on the information from the movement detection sensor 6. If the workpiece is moved, the process proceeds to step S5, and at step S5, a subroutine as described later for determining the rotational speed of the sewing machine motor 2 is executed. If the workpiece is not moved, the rotational speed control unit 114 continues to apply the minimum rotational speed value at step S6. As the result of executing steps S2 and S6, the sewing machine motor 2 maintains the minimum rotational speed even if there is no movement of the workpiece during the sewing operation, and the sewing operation is thereby maintained at the minimum speed of the needle 3.

At step S5, the processor 100 executes the subroutines illustrated in FIGS. 6 to 9 (described later). At step S5, using the output according to the knob position of the speed controller 8, the output according to the depression amount of the foot controller 10, and the movement amount of the workpiece acquired from the movement detection sensor 6 and the sewing pitch amount set by a user on the display 9, the rotational speed control unit 114 controls the rotational speed to the minimum rotational speed value by the minimum rotational speed setting unit 111, the upper limit rotational speed value by the upper limit rotational speed setting unit 112, and the rotational speed instruction value by the rotational speed determination unit 113.

According to the rotational speed controlled at step S5 or step S6, a PWM waveform is provided from the PWM unit 107 at step S7, and the sewing machine motor 2 is driven to operate the needle 3. Then, at step S8, the drive start/stop control unit 110 determines whether the start/stop key 7 of the sewing machine 1 is manipulated (pressed) or whether the foot controller 10 is turned off (released). When neither the start/stop key 7 is manipulated nor the foot controller 10 is turned off (NO), the process returns to step S3 and the rotational speed control is continued. When that the manipulation of the start/stop key 7 or the turn-off of the foot controller 10 is identified (Yes), a stop signal is transmitted to the sewing machine motor 2 at step S9, and then the drive stop control is executed to end the sewing operation.

[First Example of Rotational Speed Control]

Figure 6:
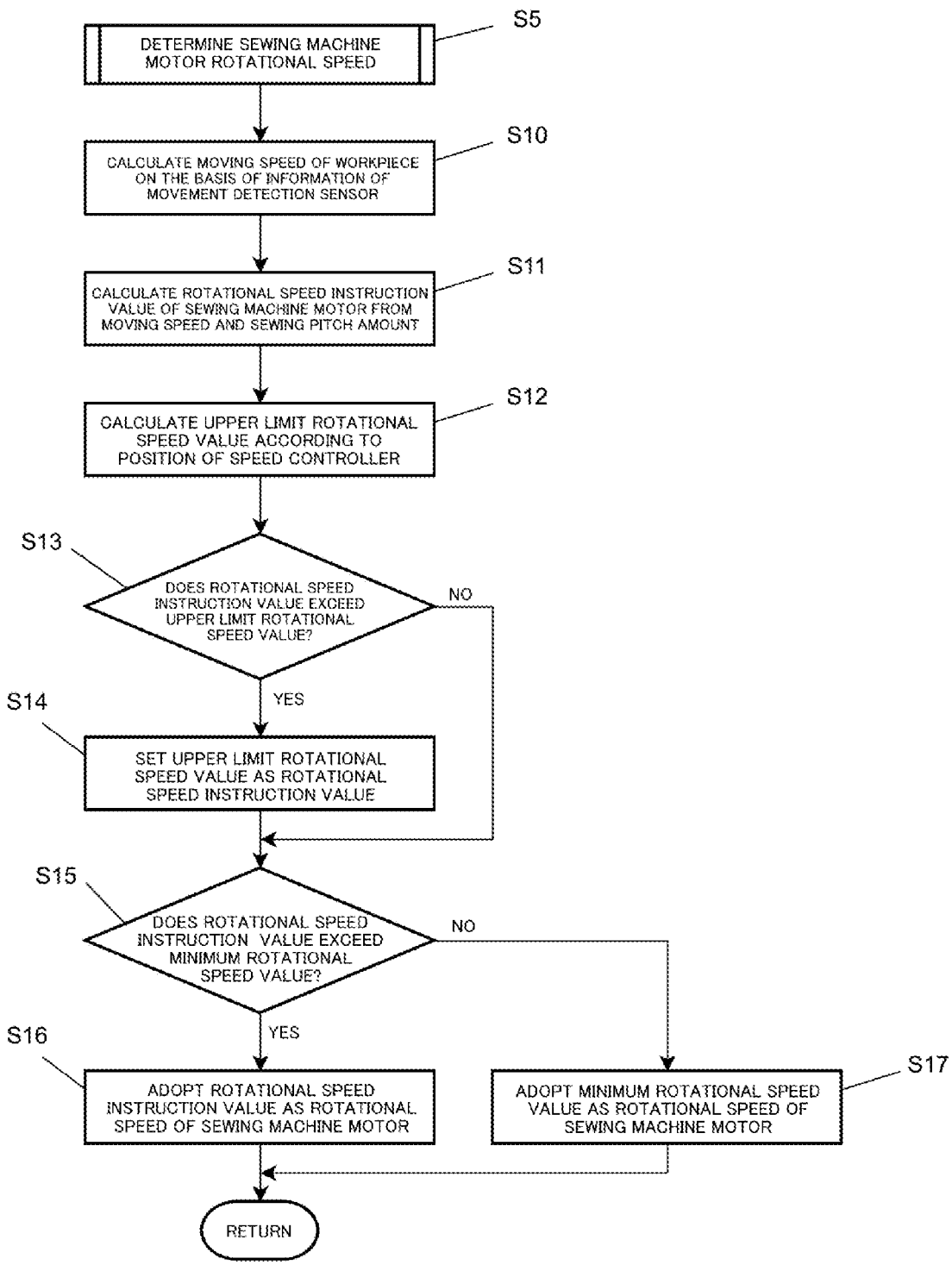
FIG. 6 is an exemplary flowchart illustrating a first example of rotational speed control executed by the processor during a sewing operation.

FIG. 6 illustrates a flowchart of a first example of the rotational speed control executed at step S5 of FIG. 5.

At step S10, the rotational speed determination unit 113 calculates the moving speed of the workpiece on the basis of the information acquired from the movement detection sensor 6. Subsequently, at step S11, the rotational speed determination unit 113 calculates the rotational speed instruction value from the sewing pitch amount set by a user using the display 9 and the moving speed by step S10. At step S12, the upper limit rotational speed setting unit 112 calculates an upper limit rotational speed value according to the position of the knob from the output of the speed controller 8.

For determination at step S13, the rotational speed control unit 114 compares the rotational speed instruction value by step S11 with the upper limit rotational speed value by step S12 to determine whether or not the rotational speed instruction value exceeds the upper limit rotational speed value. If the rotational speed instruction value exceeds the upper limit rotational speed value, the process proceeds to step S14, and at step S14, the upper limit rotational speed value is set as the rotational speed instruction value in the rotational speed control unit 114. In other words, the rotational speed of the sewing machine motor 2 is maintained at the upper limit rotational speed value.

After the upper limit rotational speed value is set as the rotational speed instruction value at step S14, or if the rotational speed instruction value does not exceed the upper limit rotational speed value at step S13, at step S15, the rotational speed control unit 114 compares the minimum rotational speed value set by the minimum rotational speed setting unit 111 with the rotational speed instruction value. If the rotational speed instruction value exceeds the minimum rotational speed value, the rotational speed control unit 114 adopts the rotational speed instruction value as the rotational speed at step S16. On the other hand, if the rotational speed instruction value does not exceed the minimum rotational speed value, the rotational speed control unit 114 adopts the minimum rotational speed value as the rotational speed at step S17. Then, the rotational speed control unit 114 drives the sewing machine motor 2 through the PWM unit 107 at the rotational speed. The sewing machine motor 2 is driven at the controlled rotational speed to operate the needle 3.

[Second Example of Rotational Speed Control]

Figure 7:
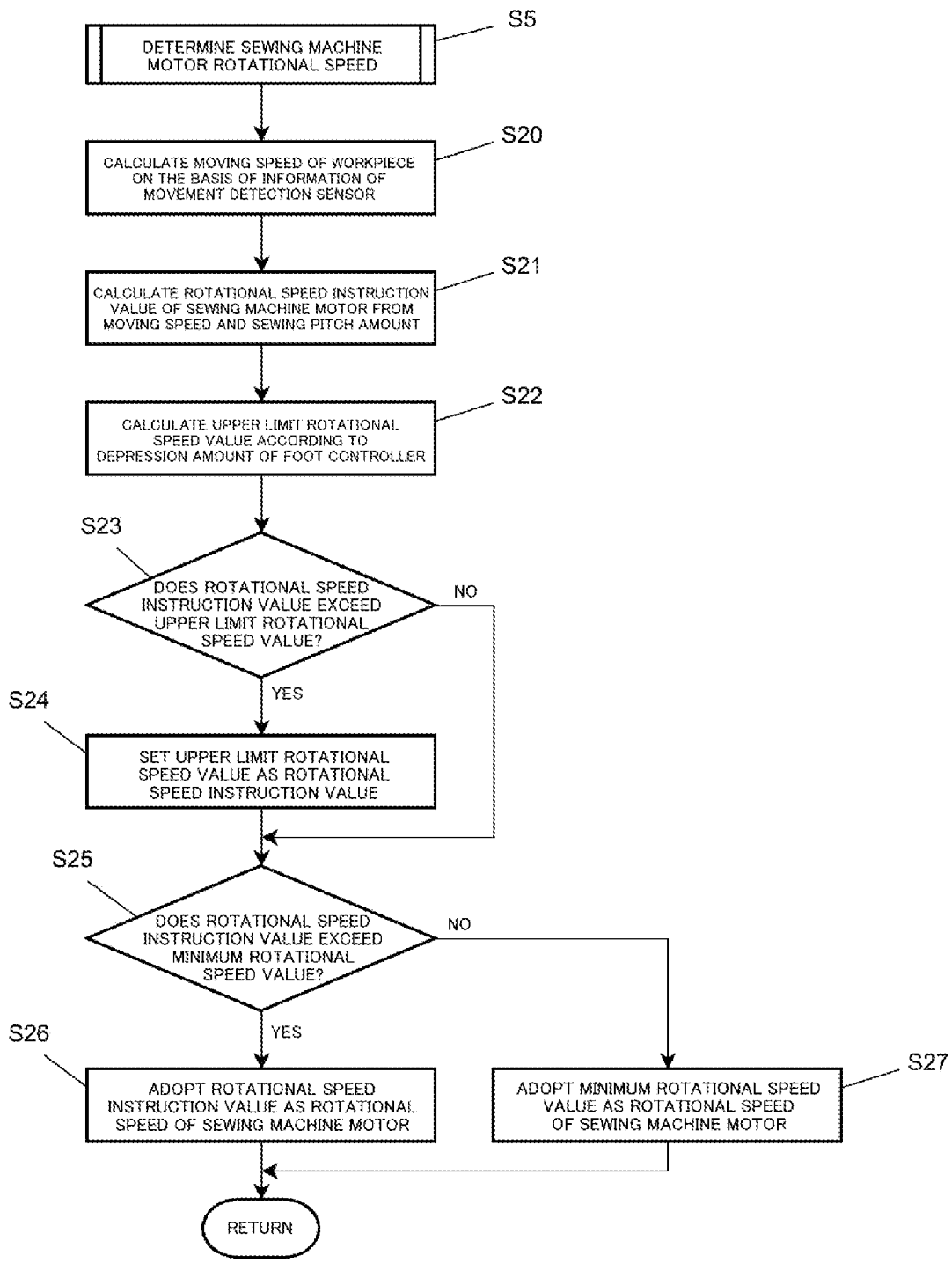
FIG. 7 is an exemplary flowchart illustrating a second example of the rotational speed control executed by the processor during the sewing operation.

FIG. 7 illustrates a flowchart of a second example of the rotational speed control executed at step S5 of FIG. 5.

At step S20, the rotational speed determination unit 113 calculates the moving speed of the workpiece on the basis of the information acquired from the movement detection sensor 6. Subsequently, at step S21, the rotational speed determination unit 113 calculates the rotational speed instruction value from the sewing pitch amount set by the user using the display 9 and the moving speed by step S20. At step S22, the upper limit rotational speed setting unit 112 calculates an upper limit rotational speed value according to the depression amount from the output of the foot controller 10.

For determination at step S23, the rotational speed control unit 114 compares the rotational speed instruction value by step S21 with the upper limit rotational speed value by step S22 to determine whether or not the rotational speed instruction value exceeds the upper limit rotational speed value. If the rotational speed instruction value exceeds the upper limit rotational speed value, the process proceeds to step S24, and at step S24, the upper limit rotational speed value is set as the rotational speed instruction value in the rotational speed control unit 114. In other words, the rotational speed of the sewing machine motor 2 is maintained at the upper limit rotational speed value.

After the upper limit rotational speed value is set as the rotational speed instruction value at step S24, or if the rotational speed instruction value does not exceed the upper limit rotational speed value at step S23, at step S25, the rotational speed control unit 114 compares the minimum rotational speed value set by the minimum rotational speed setting unit 111 with the rotational speed instruction value. If the rotational speed instruction value exceeds the minimum rotational speed value, the rotational speed control unit 114 adopts the rotational speed instruction value as the rotational speed at step S26. On the other hand, if the rotational speed instruction value does not exceed the minimum rotational speed value, the rotational speed control unit 114 adopts the minimum rotational speed value as the rotational speed at step S27. Then, the rotational speed control unit 114 drives the sewing machine motor 2 through the PWM unit 107 at the rotational speed. The sewing machine motor 2 is driven at the controlled rotational speed to operate the needle 3.

[Third Example of Rotational Speed Control]

Figure 8:
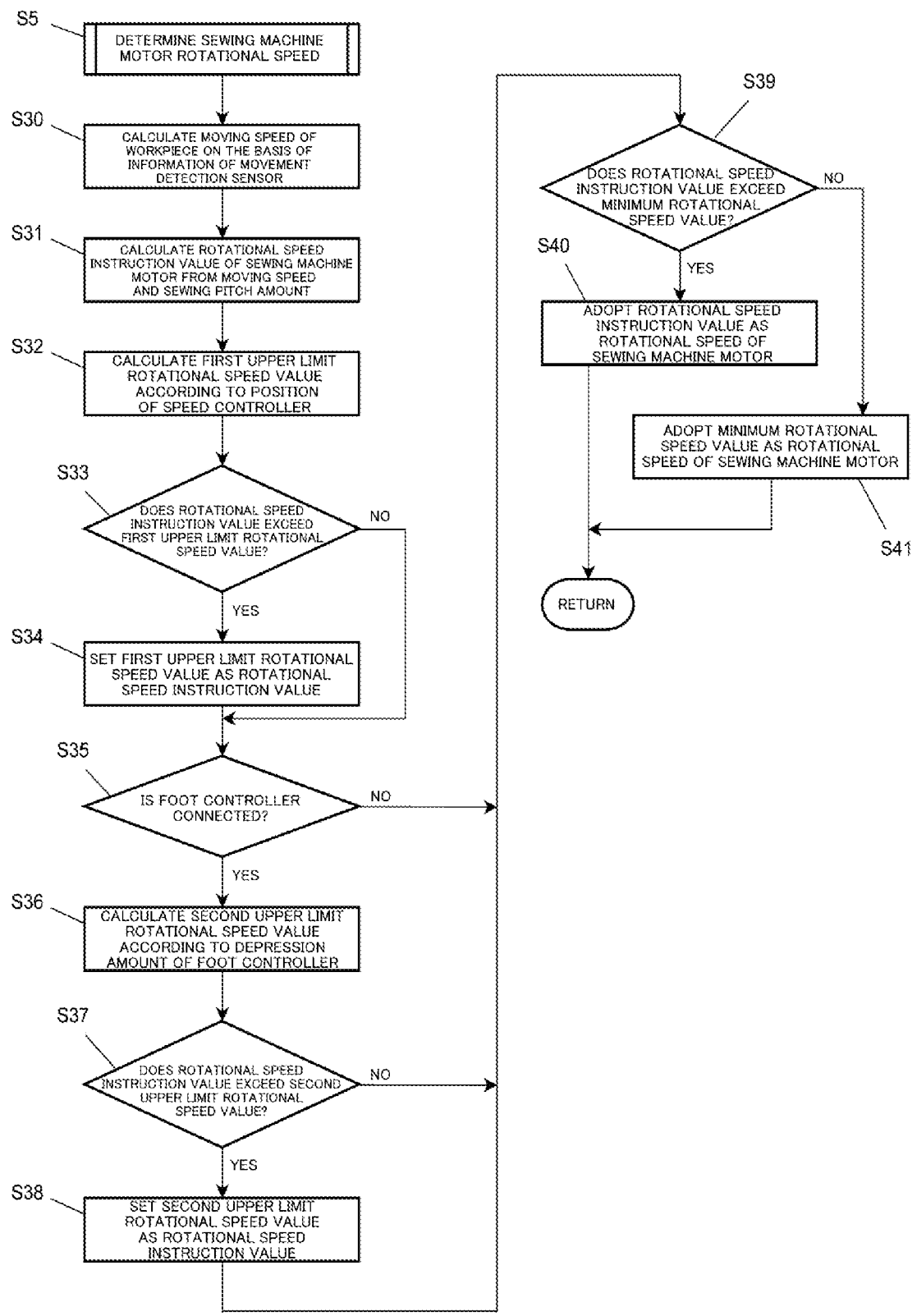
FIG. 8 is an exemplary flowchart illustrating a third example of the rotational speed control executed by the processor during the sewing operation.

FIG. 8 illustrates a flowchart of a third example of the rotational speed control executed at step S5 of FIG. 5. In the control according to the third example, a first upper limit rotational speed value set according to the position of the speed controller 8 is changed with a second upper limit rotational speed value set according to the depression amount of the foot controller 10.

At step S30, the rotational speed determination unit 113 calculates the moving speed of the workpiece on the basis of the information acquired from the movement detection sensor 6. Subsequently, at step S31, the rotational speed determination unit 113 calculates the rotational speed instruction value from the sewing pitch amount set by the user using the display 9 and the moving speed by step S30. At step S32, the upper limit rotational speed setting unit 112 calculates the first upper limit rotational speed value according to the position of the knob from the output of the speed controller 8.

For determination at step S33, the rotational speed control unit 114 compares the rotational speed instruction value by step S31 with the first upper limit rotational speed value by step S32 to determine whether or not the rotational speed instruction value exceeds the first upper limit rotational speed value. If the rotational speed instruction value exceeds the first upper limit rotational speed value, the process proceeds to step S34, and at step S34, the first upper limit rotational speed value is set as the rotational speed instruction value in the rotational speed control unit 114.

After the first upper limit rotational speed value is set as the rotational speed instruction value at step S34, or if the rotational speed instruction value does not exceed the first upper limit rotational speed value at step S33, at step S35, the processor 100 then determines whether or not the foot controller 10 is connected to the sewing machine 1. If the foot controller 10 is not connected, the process proceeds to the determination of the minimum rotational speed value at step S39. On the other hand, if the foot controller 10 is connected, the process proceeds to step S36, and at step S36, the upper limit rotational speed setting unit 112 calculates the second upper limit rotational speed value according to the depression amount from the output of the foot controller 10.

Subsequently, for determination at step S37, the rotational speed control unit 114 compares the rotational speed instruction value by step S34 and the preceding steps with the second upper limit rotational speed value by step S36 to determine whether or not the rotational speed instruction value exceeds the second upper limit rotational speed value. If the rotational speed instruction value exceeds the second upper limit rotational speed value, the process proceeds to step S38, and at step S38, the second upper limit rotational speed value is set as the rotational speed instruction value in the rotational speed control unit 114. At this time, if the foot controller 10 is not stepped on, the second upper limit rotational speed value is equal to the first upper limit rotational speed value. As the result of execution of steps S37 to S38, if the second upper limit rotational speed value is lower than the first upper limit rotational speed value, the second upper limit rotational speed value is used. In other words, the lower one of the two upper limit rotational speed values is used.

After the second upper limit rotational speed value is set as the rotational speed instruction value at step S38, or if the rotational speed instruction value does not exceed the second upper limit rotational speed value at step S37, the rotational speed control unit 114 compares the minimum rotational speed value set by the minimum rotational speed setting unit 111 with the rotational speed instruction value, at step S39. If the rotational speed instruction value exceeds the minimum rotational speed value, the rotational speed control unit 114 adopts the rotational speed instruction value as the rotational speed at step S40. On the other hand, if the rotational speed instruction value does not exceed the minimum rotational speed value, the rotational speed control unit 114 adopts the minimum rotational speed value as the rotational speed at step S41. Then, the rotational speed control unit 114 drives the sewing machine motor 2 through the PWM unit 107 at the rotational speed. The sewing machine motor 2 is driven at the controlled rotational speed to operate the needle 3.

[Fourth Example of Rotational Speed Control]

Figure 9:
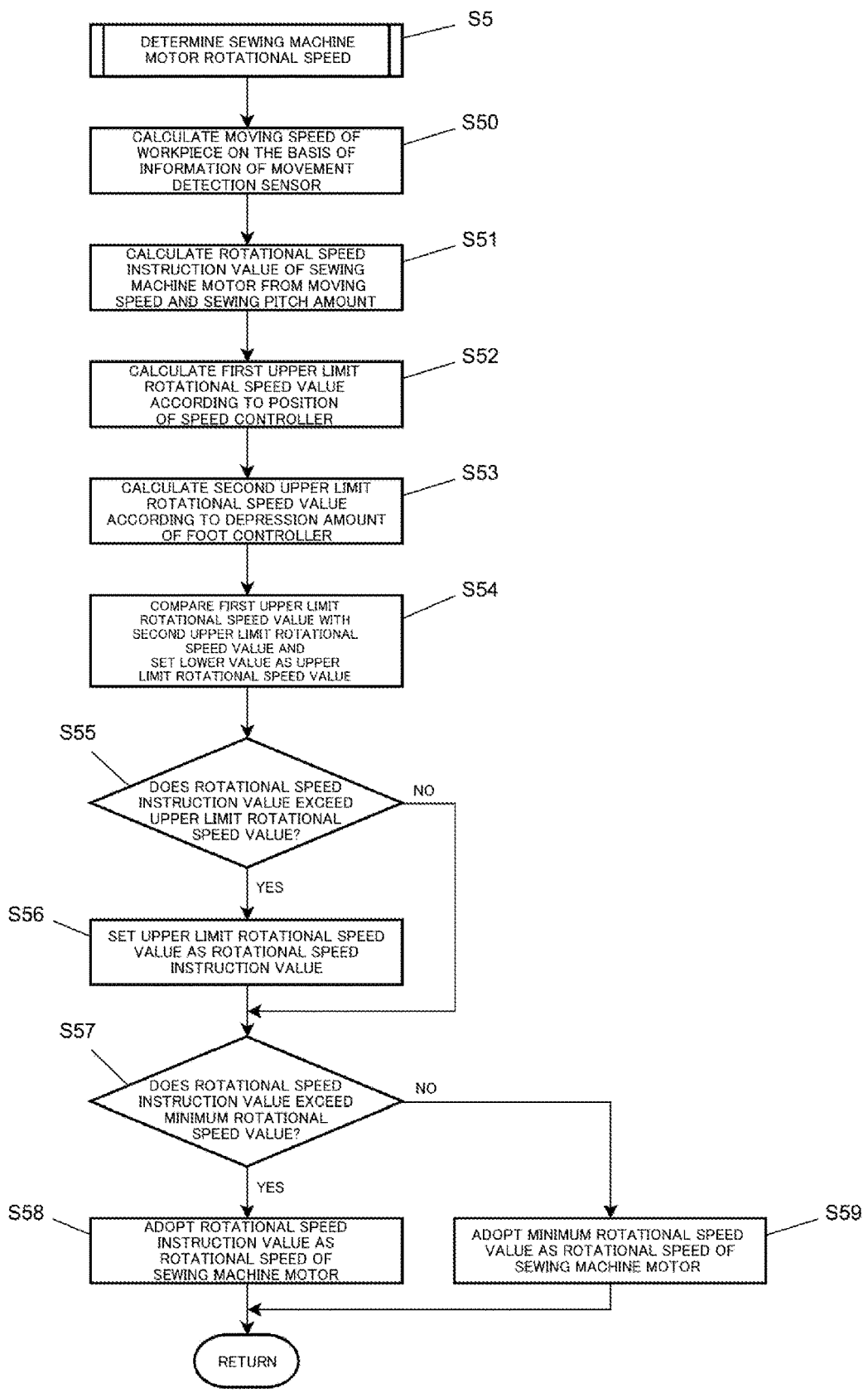
FIG. 9 is an exemplary flowchart illustrating a fourth example of the rotational speed control executed by the processor during the sewing operation.

FIG. 9 illustrates a flowchart of a fourth example of the rotational speed control executed at step S5 of FIG. 5. In the control according to the fourth example, the first upper limit rotational speed value determined according to the position of the speed controller 8 is compared with the second upper limit rotational speed value determined according to the depression amount of the foot controller 10, and the lower value thereof is set as the upper limit rotational speed value.

At step S50, the rotational speed determination unit 113 calculates the moving speed of the workpiece on the basis of the information acquired from the movement detection sensor 6. Subsequently, at step S51, the rotational speed determination unit 113 calculates the rotational speed instruction value from the sewing pitch amount set by the user using the display 9 and the moving speed by step S50.

At step S52, the upper limit rotational speed setting unit 112 calculates the first upper limit rotational speed value according to the position of the knob from the output of the speed controller 8. Further, at step S53, the upper limit rotational speed setting unit 112 calculates the second upper limit rotational speed value according to the depression amount from the output of the foot controller 10. Concerning the order of execution of these steps S52 and S53, step S52 may be executed prior to step S53, and vice versa, or steps S52 and S53 may be executed simultaneously.

At step S54, the upper limit rotational speed setting unit 112 compares the first upper limit rotational speed value by step S52 with the second upper limit rotational speed value by step S53 to set the lower value as the upper limit rotational speed value. Then, for determination at step S55, the rotational speed control unit 114 compares the rotational speed instruction value by step S51 with the upper limit rotational speed value by step S54 to determine whether or not the rotational speed instruction value exceeds the upper limit rotational speed value. If the rotational speed instruction value exceeds the upper limit rotational speed value, the process proceeds to step S56, and at step S56, the upper limit rotational speed value is set as the rotational speed instruction value in the rotational speed control unit 114. In other words, the rotational speed of the sewing machine motor 2 is maintained at the upper limit rotational speed value.

After the upper limit rotational speed value is set as the rotational speed instruction value at step S56, or if the rotational speed instruction value does not exceed the upper limit rotational speed value at step S55, at step S57, the rotational speed control unit 114 compares the minimum rotational speed value set by the minimum rotational speed setting unit 111 with the rotational speed instruction value. If the rotational speed instruction value exceeds the minimum rotational speed value, the rotational speed control unit 114 adopts the rotational speed instruction value as the rotational speed at step S58. On the other hand, if the rotational speed instruction value does not exceed the minimum rotational speed value, the rotational speed control unit 114 adopts the minimum rotational speed value as the rotational speed at step S59. Then, the rotational speed control unit 114 drives the sewing machine motor 2 through the PWM unit 107 at the rotational speed. The sewing machine motor 2 is driven at the controlled rotational speed to operate the needle 3.

The embodiments described above by disclosing some examples have the following advantages.

When the sewing operation is started with the start/stop key 7 or the foot controller 10 turned on, the needle 3 initially moves slowly at the minimum rotational speed. Thus, sewing can be performed at a constant slow speed, and stitches with an even sewing pitch can be easily formed. In addition, when the depression of the foot controller 10 is loosened or a user's foot is moved away during the sewing operation, the needle 3 can be slowly moved at the minimum rotational speed, and the sewing pitch can be easily adjusted.

When the operation speed of the needle 3 becomes too fast during the sewing operation, it becomes difficult to control the workpiece and to maintain a constant sewing pitch. Moreover, a user who manipulates the workpiece is likely to make a mistake. This can be avoided by providing the upper limit rotational speed. Further, the upper limit rotational speed can be controlled in accordance with the user's preference using the position of the speed controller 8 or the depression of the foot controller 10. Since a lower speed is employed as the upper limit rotational speed in a case where the upper limit rotational speed can be set by both the speed controller 8 and the foot controller 10, ease of control and safety are further improved.

For example, even if the foot controller 10 is fully depressed, the operation control is executed such that the operation speed does not exceed the upper limit rotational speed according to the speed controller 8. Furthermore, in the rotational speed control region (see FIG. 4) in which the rotational speed exceeds the minimum rotational speed, the operation speed of the needle 3 is adjusted according to the moving speed of a workpiece moved by a user, and as the user moves the workpiece faster, the operation speed of the needle 3 becomes higher and the sewing can be performed speedily until the rotational speed reaches the upper limit rotational speed. The upper limit rotational speed (in other words, an upper limit operation speed of the needle 3) can be adjusted in accordance with the position of the speed controller 8 or the depressing of the foot controller 10.

The disclosed embodiments are not limited to the above-described examples, and includes various modifications. For example, the above-described examples have been described in detail for easy understanding of the embodiments, but the examples are not necessarily limited to those having all the described configurations. A component or components of some of the examples can be replaced with the component or components of another example, and a component or components of some of the examples can be added to one of the examples. For a component or components of the respective examples, the addition of different component(s), deletion or replacement can be made.

Some or all of the above-described configurations, functions, processing units, processing means, and the like may be implemented using hardware, for example, by designing with an integrated circuit. Alternatively, the above-described configurations, functions, and the like may be implemented using software executed by a processor interpreting and executing programs for implementing the respective functions. Information such as a program, a table, and a file for implementing each function can be stored in a storage such as a memory, a hard disk, and a solid state drive (SSD), or a recording medium such as an IC card, an SD card, and a DVD.

The control lines and the information lines indicate what is considered to be necessary for the description, and do not necessarily indicate all the control lines and the information lines on the product. In practice, it may be considered that almost all the configurations are connected to each other.

The above-described examples disclose at least the claimed concepts, and discloses, for example, the following.

[1] A sewing machine 1 includes:
a rotational speed determination unit 113 configured to determine a rotational speed instruction value on the basis of information from a movement detection sensor 6 that detects movement of a workpiece and a predetermined sewing pitch amount (set by a user);
an upper limit rotational speed setting unit 112 configured to set an upper limit rotational speed value;
a rotational speed control unit 114 configured to control a rotational speed to the rotational speed instruction value, wherein the rotational speed control unit 114 is configured to control the rotational speed to the upper limit rotational speed value when the rotational speed instruction value reaches the upper limit rotational speed value; and
a sewing machine motor 2 driven at the controlled rotational speed to operate a needle 3.

[2] The upper limit rotational speed setting unit 112 is configured to set the upper limit rotational speed value on the basis of at least an output from a speed controller 8.

[3] The upper limit rotational speed setting unit 112 is configured to set the upper limit rotational speed value on the basis of at least an output from a foot controller 10.

[4] The upper limit rotational speed setting unit 112 is configured to set a first upper limit rotational speed value on the basis of an output from a speed controller 8 and set a second upper limit rotational speed value on the basis of an output from a foot controller 10, and
the rotational speed control unit 114 is configured to use the second upper limit rotational speed value as the upper limit rotational speed value when the second upper limit rotational speed value is lower than the first upper limit rotational speed value.

[5] The upper limit rotational speed setting unit 112 is configured to calculate a first upper limit rotational speed value on the basis of an output from a speed controller 8, and calculate a second upper limit rotational speed value on the basis of an output from a foot controller 10, wherein the upper limit rotational speed setting unit 112 is configured to compare the first upper limit rotational speed value with the second upper limit rotational speed value to set a lower value as the upper limit rotational speed value.

[6] The sewing machine 1 further includes:
a minimum rotational speed setting unit 111 configured to set a minimum rotational speed value,
in which the rotational speed control unit 114 is configured to control the rotational speed to the minimum rotational speed value until the rotational speed instruction value exceeds the minimum rotational speed value, and control the rotational speed to the rotational speed instruction value when the rotational speed instruction value exceeds the minimum rotational speed value.

[7] An image sensor is used for the movement detection sensor 6, wherein image data is obtained by imaging the workpiece with the image sensor and the image data is image-processed to acquire the information regarding movement of the workpiece.

[8] A method for controlling a sewing machine 1, the sewing machine 1 including a sewing machine motor 2 for operating a needle 3 and a processor 100 for controlling the sewing machine motor 2, the method including the following steps executed by the processor 100:
determining a rotational speed instruction value on the basis of information from a movement detection sensor 6 that detects movement of a workpiece and a predetermined sewing pitch amount (set by a user);
setting an upper limit rotational speed value;
controlling a rotational speed to the rotational speed instruction value, wherein the rotational speed is controlled to the upper limit rotational speed value when the rotational speed instruction value reaches the upper limit rotational speed value; and
driving the sewing machine motor 2 at the controlled rotational speed.

[9] In the above method, the upper limit rotational speed value is set on the basis of at least an output from a speed controller 8.

[10] In the above method, the upper limit rotational speed value is set on the basis of at least an output from a foot controller 10.

[11] In the above method,
a first upper limit rotational speed value is set on the basis of an output from a speed controller 8 and a second upper limit rotational speed value is set on the basis of an output from a foot controller 10, and
the second upper limit rotational speed value is used as the upper limit rotational speed value when the second upper limit rotational speed value is lower than the first upper limit rotational speed value.

[12] In the above method,
a first upper limit rotational speed value is calculated on the basis of an output from a speed controller 8, and a second upper limit rotational speed value is calculated on the basis of an output from a foot controller 10, wherein the first upper limit rotational speed value is compared with the second upper limit rotational speed value and a lower value is set as the upper limit rotational speed value.

[13] The method further includes the following steps executed by the processor 100:
setting a minimum rotational speed value; and
controlling the rotational speed to the minimum rotational speed value until the rotational speed instruction value exceeds the minimum rotational speed value, and controlling the rotational speed to the rotational speed instruction value when the rotational speed instruction value exceeds the minimum rotational speed value.

[14] A computer program (a computer program product containing computer-executable instructions, or a computer-readable storage medium containing computer-executable instructions) that, when executed by a processor 100 of a sewing machine 1, causes the processor 100 to execute the method according to any one of [8] to [13] above.

The embodiments have been described with reference to several examples. However, other than the examples, various embodiments can be conceived on the basis of the scope understood in the above description.

What is claimed is:

1. A sewing machine, comprising:
    a rotational speed determination unit configured to determine a rotational speed instruction value on the basis of information from a movement detection sensor that detects movement of a workpiece and a predetermined sewing pitch amount;
    an upper limit rotational speed setting unit configured to set an upper limit rotational speed value on the basis of at least an output from a foot controller;
    a rotational speed control unit configured to control a rotational speed to the rotational speed instruction value, wherein the rotational speed control unit is configured to control the rotational speed to the upper limit rotational speed value when the rotational speed instruction value reaches the upper limit rotational speed value; and
    a sewing machine motor driven at the controlled rotational speed to operate a needle.

2. The sewing machine according to claim 1, wherein the upper limit rotational speed setting unit is further configured to set the upper limit rotational speed value on the basis of an output from a speed controller.

3. The sewing machine according to claim 1,
    wherein the upper limit rotational speed setting unit is configured to set a first upper limit rotational speed value on the basis of an output from a speed controller and set a second upper limit rotational speed value on the basis of an output from the foot controller, and
    wherein the rotational speed control unit is configured to use the second upper limit rotational speed value as the upper limit rotational speed value when the second upper limit rotational speed value is lower than the first upper limit rotational speed value.

4. The sewing machine according to claim 1,
    wherein the upper limit rotational speed setting unit is configured to calculate a first upper limit rotational speed value on the basis of an output from a speed controller and calculate a second upper limit rotational speed value on the basis of an output from the foot controller, and
    wherein the upper limit rotational speed setting unit is configured to compare the first upper limit rotational speed value with the second upper limit rotational speed value to set a lower value as the upper limit rotational speed value.

5. The sewing machine according to claim 1, further comprising:
    a minimum rotational speed setting unit configured to set a minimum rotational speed value,
    wherein the rotational speed control unit is configured to control the rotational speed to the minimum rotational speed value until the rotational speed instruction value exceeds the minimum rotational speed value, and control the rotational speed to the rotational speed instruction value when the rotational speed instruction value exceeds the minimum rotational speed value.

6. The sewing machine according to claim 1, wherein an image sensor is used for the movement detection sensor, wherein image data is obtained by imaging the workpiece with the image sensor and the image data is image-processed to acquire the information regarding movement of the workpiece.

7. A method for controlling a sewing machine, the sewing machine including a sewing machine motor for operating a needle and a processor for controlling the sewing machine motor, the method comprising the following steps executed by the processor:
    determining a rotational speed instruction value on the basis of information from a movement detection sensor that detects movement of a workpiece and a predetermined sewing pitch amount;
    setting an upper limit rotational speed value on the basis of at least an output from a foot controller;
    controlling a rotational speed to the rotational speed instruction value, wherein the rotational speed is controlled to the upper limit rotational speed value when the rotational speed instruction value reaches the upper limit rotational speed value; and
    driving the sewing machine motor at the controlled rotational speed.

8. The method according to claim 7, wherein the upper limit rotational speed value is set also on the basis of an output from a speed controller.

9. The method according to claim 7, wherein a first upper limit rotational speed value is set on the basis of an output from a speed controller and a second upper limit rotational speed value is set on the basis of an output from the foot controller, and
    wherein the second upper limit rotational speed value is used as the upper limit rotational speed value when the second upper limit rotational speed value is lower than the first upper limit rotational speed value.

10. The method according to claim 7,
    wherein a first upper limit rotational speed value is calculated on the basis of an output from a speed controller and a second upper limit rotational speed value is calculated on the basis of an output from the foot controller, and
    wherein the first upper limit rotational speed value is compared with the second upper limit rotational speed value and a lower value is set as the upper limit rotational speed value.

11. The method according to claim 7, further comprising the following steps executed by the processor:
    setting a minimum rotational speed value; and
    controlling the rotational speed to the minimum rotational speed value until the rotational speed instruction value exceeds the minimum rotational speed value, and controlling the rotational speed to the rotational speed instruction value when the rotational speed instruction value exceeds the minimum rotational speed value.

12. A sewing machine, comprising:
    a processor configured to:
    determine a rotational speed instruction value on the basis of information from a movement detection sensor that detects movement of a workpiece and a predetermined sewing pitch amount;
    set an upper limit rotational speed value on the basis of at least an output from a foot controller;
    control a rotational speed to the rotational speed instruction value; and
    control the rotational speed to the upper limit rotational speed value when the rotational speed instruction value reaches the upper limit rotational speed value; and
    a sewing machine motor driven at the controlled rotational speed to operate a needle.

13. The sewing machine according to claim 12, wherein the processor is further configured to set the upper limit rotational speed value on the basis of an output from a speed controller.

14. The sewing machine according to claim 12,
wherein the processor is configured to set a first upper limit rotational speed value on the basis of an output from a speed controller and set a second upper limit rotational speed value on the basis of an output from the foot controller, and
wherein the processor is configured to use the second upper limit rotational speed value as the upper limit rotational speed value when the second upper limit rotational speed value is lower than the first upper limit rotational speed value.

15. The sewing machine according to claim 12,
wherein the processor is configured to calculate a first upper limit rotational speed value on the basis of an output from a speed controller and calculate a second upper limit rotational speed value on the basis of an output from the foot controller, and
wherein the processor is configured to compare the first upper limit rotational speed value with the second upper limit rotational speed value to set a lower value as the upper limit rotational speed value.

16. The sewing machine according to claim 12, wherein the processor is configured to:
set a minimum rotational speed value; and
control the rotational speed to the minimum rotational speed value until the rotational speed instruction value exceeds the minimum rotational speed value, and control the rotational speed to the rotational speed instruction value when the rotational speed instruction value exceeds the minimum rotational speed value.

17. The sewing machine according to claim 12, wherein an image sensor is used for the movement detection sensor, wherein image data is obtained by imaging the workpiece with the image sensor and the image data is image-processed to acquire the information regarding movement of the workpiece.

* * * * *